ated Aug. 25, 1970

United States Patent

[11] 3,525,288

[72] Inventor Carl F. Schorn
Troy, Michigan
[21] Appl. No. 776,906
[22] Filed Nov. 19, 1968
[45] Patented Aug. 25, 1970
[73] Assignee Holley Carburetor Company
Warren, Michigan
a corporation of Michigan

[54] FAIL-SAFE SERVO DEVICE
11 Claims, 6 Drawing Figs.
[52] U.S. Cl. ............................................. 91/360,
91/374, 91/375
[51] Int. Cl. ..............................................F15b 20/00,
F15b 9/02
[50] Field of Search .................................. 91/360,
374, 375

[56] References Cited
UNITED STATES PATENTS
2,365,742  12/1944  Brooks .......................... 91/375
2,738,770  3/1956   Granzow ....................... 91/360
2,964,014  12/1960  Quintard ....................... 91/375X
3,185,439  5/1965   Inaba et al. .................... 91/375X FOREIGN PATENTS
561,811  6/1944   Great Britain ............ 91/375
655,892  12/1928  France ..................... 91/375

Primary Examiner—Martin P. Schwadron
Assistant Examiner—Irwin C. Cohen
Attorney—Walter Potoroka, Sr.

ABSTRACT: A servo device is provided with an input lever, rotatable in accordance with input signals directed thereto by cooperating motion transmitting members, which cooperates with a plurality of servo valves for causing a pressure responsive piston to supply an actuating force to an associated output member; the output member includes a rotatable housing containing the servo valves and carrying resilient biasing springs urging the servo valves into abutting engagement with the input lever which is also closely contained by said housing for rotation therewith; an additional resilient biasing member is engageable by the input lever when the input lever and housing have been rotated to some predetermined angular position; the resilient biasing springs and the resilient biasing member cooperating with each other to determine a null condition for the servo valves whenever there is a failure in the cooperating motion transmitting members.

Patented Aug. 25, 1970
3,525,288
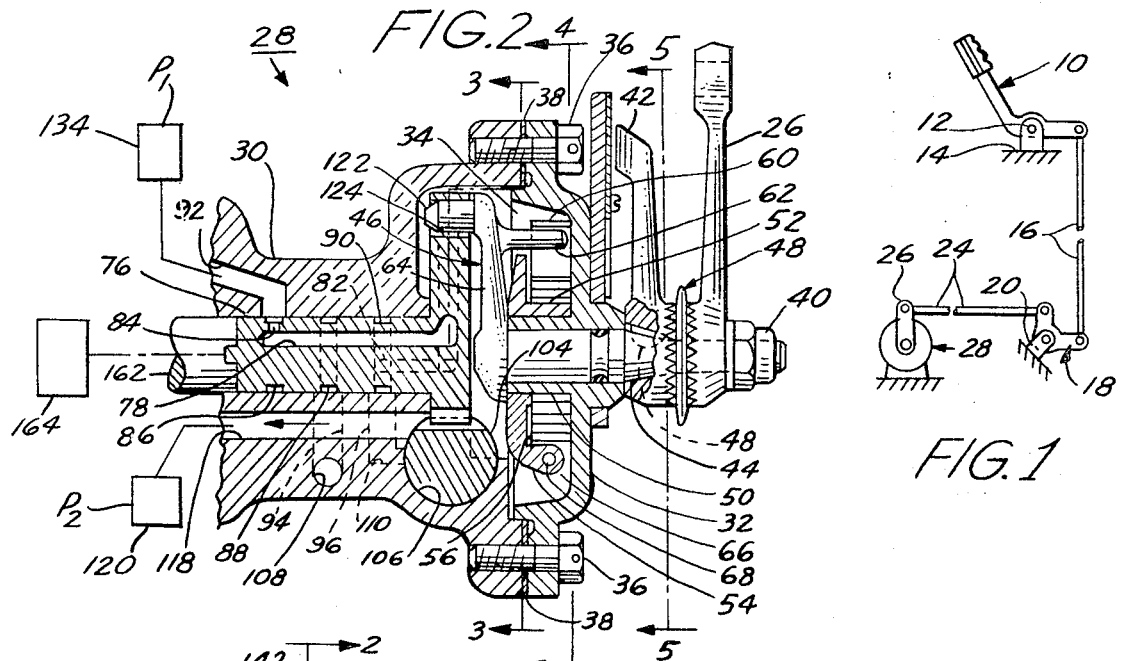
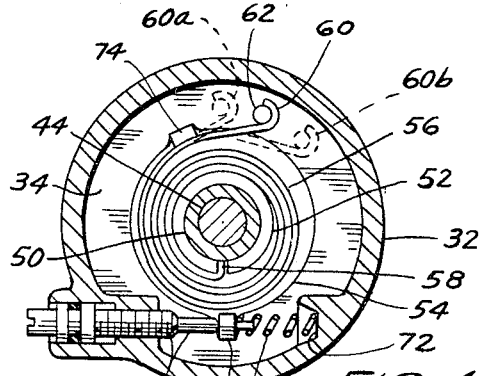
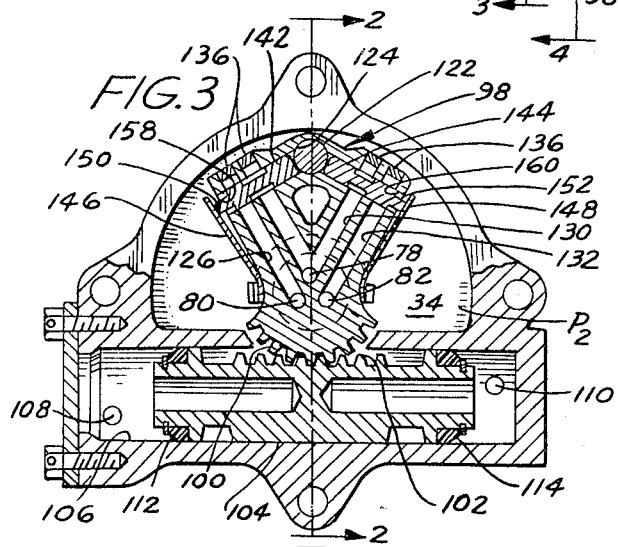
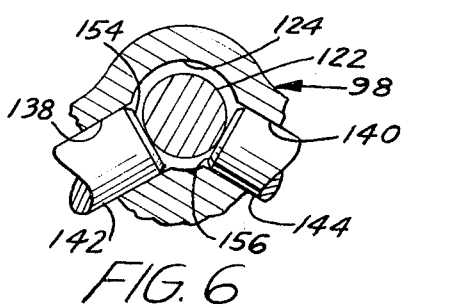
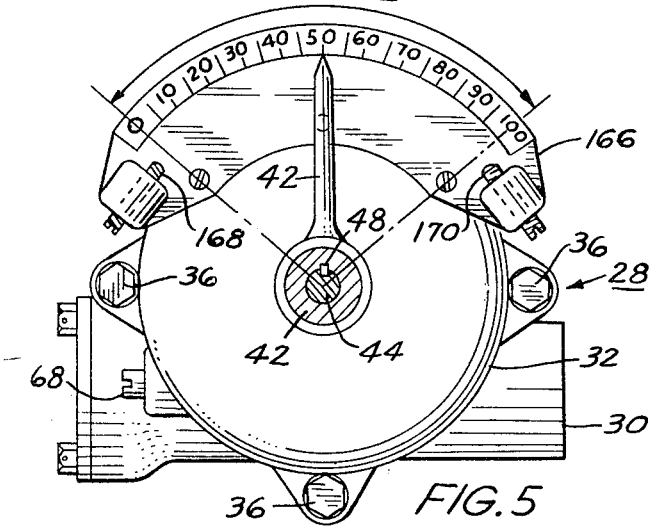
CARL F. SCHORN
INVENTOR.
BY
Walter Potoroka Sr.
ATTORNEY

FAIL-SAFE SERVO DEVICE

BACKGROUND OF THE INVENTION

In many instances there is a requirement for force transmission as from some selector lever to a remotely situated device. Often in such situations, as for example in aircraft, there is also included, within the over-all system, a suitable power or force amplifying means. As in aircraft, the pilot controls levers, within the pilot's cabin, which must ultimately control such devices as ailerons, rudder or even jet engine fuel controls all of which are remotely located with respect to the pilot's cabin.

Accordingly, in order to effect such force transmission it is necessary to provide suitable linkage means such as cables and/or rods. However, the provision of motion or force transmitting cables and/or rods often presents another unavoidable hazard in that they are susceptible to failure as is any structure.

In the past, if such a failure occurred, it could become a major factor if, for example, the failure occurred in the linkage leading to the fuel control when the fuel control was set at low or idle rate of fuel flow. This could happen, for example, during brief deceleration, as would occur during approach to a landing, followed immediately with a demand for an increase in rate of fuel flow in order to sustain landing speeds. If the linkage failed during this brief deceleration, it is apparent that the subsequent requirement for increased fuel flow could not be met.

SUMMARY OF THE INVENTION

According to the invention a servo device comprises a housing, a first output member journalled for rotation and carried by said housing, a second input member journalled for rotation and also carried by said housing, at least a first portion of said second input member being operatively constrained by said first output member, valve means carried by said first output member and having a null position with respect thereto, first resilient means urging said valve means into operative engagement with said first portion of said second input member, said first portion of said second input member being effective to at times cause said valve means to experience relative motion with respect to said second output member, a pressure responsive member operatively engaging said first output member, said valve means being effective when moved from said null position as caused by said relative motion to create a pressure differential across said pressure responsive member thereby causing said pressure responsive member to forcibly rotate said first output member as long as the position of said valve means is other than said null position, second resilient means, and a second portion carried by said second input member effective for engaging said second resilient means, said second resilient means being effective to cause said first output member to rotate to a predetermined angular position with respect to said housing whereat said valve means attain said null position thereby stopping further motion of said pressure responsive member and said first output member, said second resilient means being so effective for causing said rotation of said first output member whenever said second input member is released for free and unrestricted rotational movement with respect to said housing.

Accordingly, a general object of this invention is to provide a servo device which not only serves as an intermediate motion transmitting device for receiving input signals from a remote source and creating output movements in accordance with such input signals, but also such a device which is responsive to the occurrence of a failure in the associated structure for conveying such input signals and in response thereto create a predetermined output movement.

Another object is to provide a device having power modification to maximize output force from a minimum input force.

Other more specific objects and advantages of the invention will become apparent when reference is made to the following detailed description considered in conjunction with the drawings.

DESCRIPTION OF THE DRAWINGS

In the drawings:

FIG. 1 is a schematic illustration of a typical force or signal transmitting assembly including various levers and linkages;

FIG. 2 is a longitudinal cross-sectional view of a servo device constructed in accordance with the invention with the view being taken generally on the plane of line 2-2 of FIG. 3;

FIG. 3 is a generally transverse cross-sectional view taken substantially on the plane of line 3-3 of FIG. 2 and looking in the direction of the arrows;

FIG. 4 is a generally transverse cross-sectional view taken substantially on the plane of line 4-4 of FIG. 2 and looking in the directions of the arrows;

FIG. 5 is substantially an end elevational view taken generally on the plane of line 5-5 of FIG. 2 and looking in the direction of the arrows; and FIG. 6 is an enlarged fragmentary portion of certain elements shown in FIG. 3.

DESCRIPTION OF PREFERRED EMBODIMENT

Referring now in greater detail to the drawings, FIG. 1 illustrates, generally, an arrangement whereby certain input signals are transmitted, through suitable motion transmitting means, to an ultimate member remotely situated with respect to the point at which such input signals are initiated.

For example, a manually positionable lever 10 pivotally secured as at 12 to a support 14 has one arm portion pivotally connected to a motion transmitting linkage 16 which, in turn, is pivotally connected at its other end to one arm of a bellcrank 18, pivotally secured to a support 20, which has its other arm 22 pivotally connected to a motion transmitting linkage 24. The other end of linkage 24 is pivotally secured to a lever or arm 26 of some control device 28. As previously indicated, there is always a risk that because of some unforeseen occurrence, some portion of the over-all motion transmitting linkage or means between the input lever 10 and control lever or arm 26 might fail. Accordingly, it is with this thought in mind that the invention herein disclosed provides means for sensing such a failure and consequently producing predictable output movements of its own.

FIG. 2, a cross-sectional view taken generally on the plane of line 2-2 of FIG. 3, illustrates the assembly 28 being comprised of a housing portion 30 cooperating with a coacting cover 32 to generally define therebetween a chamber 34. Suitable means such as screws 36 may be employed to hold cover 32 and a seal 38 against housing 30.

Even though the invention is not so limited, but for purposes of illustration let it be assumed that assembly 28 is employed in conjunction with a turbine engine fuel control as commonly used on jet aircraft and that lever 10, of FIG. 1, is the pilot operated throttle setting lever while lever 26 is the fuel control throttle lever.

Accordingly, it can be seen that the throttle lever 26 is held, as by a suitable nut 40, in assembled relation to an indicator arm 42 which, in turn, is angularly fixed to a shaft 44, of an input lever 46, as by a key 48. The respective angular positions of indicator arm 42 and throttle lever 26 may be adjusted and set, if desired, by use of a driving connecting dog 48 provided with oppositely disposed angularly positioned serrations or teeth (as also disclosed at 63, 66, 68, 70 and 72 of U.S. Pat. No. 3,063,305, issued to R. L. Ensinger).

The inner side of cover 32 is provided with a tubular extension 50 the inner surface of which serves to journal shaft 44 while the outer surface journals a tubular extension 52 of a collar 54. Consequently, collar 54 and input lever 46 are rotatable with respect to each other and to the cover 32. A torsion spring 56, having one end 58 secured within a slot formed in tubular extension 52 of collar 54 (also see FIG. 4), is wound in a generally coiled configuration about tubular extension 52 and has its other end 60 formed into a hook-like configuration which is adapted to abutably engage a lateral extension or pin 62 carried by arm 64 of input lever 46.

As illustrated in FIGS. 4 and 5, collar 54 carries a laterally projecting abutment arm portion 66 which is so positioned as to normally abut against a threadably adjustable stop 68 when urged thereagainst by a compression spring 70 engaging, at its opposite ends a spring pocket 72, formed in cover 32, and abutment arm 66. The upper portion of collar 54 carries a second laterally projecting stop member or portion 74, which may be integrally formed with the collar 54, against which the coil spring 56 abuts (at the underside thereof) thereby establishing a preload in torsion spring 56.

An output shaft 76, suitably journalled within housing 30, contains three axially directed passages or conduits 78, 80 and 82 which, through suitable radially directed passageways, such as at 84, respectively communicate with circular grooves 86, 88 and 90. Such grooves are provided so as to enable continuous communication between axial conduits 78, 80, 82 and conduits 92, 94 and 96, respectively, formed in housing 30.

Output shaft 76 is also provided, as at one end thereof, with an upwardly situated valve housing 98 and a downwardly depending gear sector 100 which operatively engages a gear rack 102 carried by a piston 104 situated within a cylinder 106. As seen in FIGS. 2 and 3, the ends of cylinder 106 are respectively in communication with conduits 108, 110 which, in turn, respectively communicate with conduits 94 and 96.

As can be seen in FIG. 3, the space axially between end seals 112, 114 of piston 104 is vented to chamber 34 by virtue of the space or opening 116 formed in the upper wall of cylinder 106 accommodating the passage therethrough of the gear sector 100. Such space or opening 116 also permits communication with a conduit 118 (FIG. 2) which, in turn, communicates with a relatively low pressure, $P_2$, reservoir or sink 120. Generally, when piston 104 is caused to move to the left, the cooperating gear rack 102 and gear sector 100 cause the output shaft 76 to rotate clockwise as viewed in FIG. 3 and, of course, rightward movement of piston 104 causes counterclockwise rotation of shaft 76.

A second laterally extending driving pin 122 formed at the upper part of input lever arm 64 is received within an aperture 124 formed in the valve housing section 98. Pin 122, as illustrated in enlarged form in FIG. 6, is closely but not tightly received within aperture 124.

Valve housing 98 has formed therein a plurality of passages or conduits 126, 128, 130 and 132. As can be seen by both FIGS. 2 and 3, conduit 126 is in continual communication with conduit 80, conduit 132 continually communicates with conduit 82 while axial conduit 78 communicates with both conduits 128 and 130. Conduit 78, as illustrated in FIG. 2, is in constant communication, via conduit 92, with a source 134 of relatively high pressure $P_1$. The upper ends of conduits 126, 128, 130 and 132 may contain suitable end plugs 136.

Valve passages 138 and 140 respectively formed generally transversely through conduits 126, 128 and conduits 130, 132 slidably receive spool type valves 142 and 144. As shown in FIG. 3, leaf type springs 146 and 148 respectively anchored at their one ends to valve housing 98 have their free ends abutably engaging the outer ends 150 and 152 of the valves 142 and 144. Springs 146 and 148 normally urge valves 142 and 144 inwardly causing ends 154 and 156 of valves 142 and 144 into abutting engagement with pin 122 of input lever 46.

Each of the valves 142 and 144 have a generally medially situated groove so as to thereby provide axially spaced oppositely disposed land portions which are effective to at times permit while at other times terminate communication as between, for example, conduits 126 and 128 or conduits 130 and 132. Further, both valve passages 138 and 140 are so formed as to respectively provide conduit portions 158 and 160 through the wall of valve housing 98 to provide for communication between conduit 126 and chamber 34 as well as between the same chamber 34 and conduit 132. However, the lands of valves 142 and 144 are such as to also determine whether or not such communication is established through conduit portions 158 and 160.

As illustrated in FIG. 2, the output shaft 76 of assembly 28 may be operatively connected, as by a tongue and groove, with another shaft 162 or other operating linkage which is part of an overall structure such as a fuel control 164. A plate 166 with graduations affixed thereto may be situated on cover 32 so as to cooperate with indicator 42 in order to visually indicate the relative position of the output shaft 76 anywhere from zero percent (0.0 percent) throttle opening to one hundred percent (100.0 percent) throttle opening. Further, if desired, adjustable positive stops 168 and 170 may be provided for mechanically engaging indicator 42 at its extreme positions.

OPERATION

In the preferred mode of operation of the invention, when throttle lever 26 is rotated counterclockwise so as to cause the indicator 42 to be in the "low throttle settings" generally in the area designated by graduation readings "0" to say "45", pin or projection 62 do not engage hook 60 of spring 56. However, if it is assumed that end 60 of spring 56, when not engaging pin 62, is in the position illustrated at 60a of FIG. 4, it can be seen that clockwise rotation of throttle lever 26 causes corresponding rotation of input lever 46 resulting in pin 62 engaging hook 60 at a graduation position of "50" illustrated by the position depicted at 60a. Further clockwise rotation causes pin 62 to move hook 60 to successive positions corresponding to, for example, graduation settings of "72" and "95" as illustrated by the hook end at 60 and 60b. Since collar 54 is precluded from clockwise rotation by stop 68, such clockwise rotation of hook end 60 causes an increase in the force of spring 56.

Since there is a clearance between pin 122 of input lever 46 and aperture 124 of valve housing 98, clockwise rotation of throttle lever 26 causes pin 122 to move at least slightly toward the right side of aperture 124 (as viewed in FIG. 4). Such relative movement between pin 122 and aperture 124 results in servo valve 144 being moved generally to the right (as viewed in both FIGS. 3 and 6) causing orifice or conduit portion 160 to be closed while communication between conduits 130 and 132 would be completed by the annular groove of the spool type valve 144. Consequently, the relatively high fluid pressure at a pressure $P_1$ supplied by source 134 is directed through conduits 92, 78, 130, 132, axial conduit 82, and branch conduits 96 and 110 into cylinder 106 at the right end of piston 104.

The above rightward movement of servo valve 144 is accompanied by a rightward movement of servo valve 142, effected by leaf spring 146 maintaining end 154 in abutting contact with input lever pin 122. Such rightward movement of servo valve 142 prevents any communication between conduits 126 and 128 but does establish communication, by means of conduit portion 158, between conduit 126 and the low fluid pressure $P_2$ of chamber 34. Accordingly, low pressure $P_2$ is communicated through conduit 126, axial conduit 80, annular groove 88, and branch conduits 94, 108 to cylinder 106 at the left end of piston 104. The differential of pressures $P_1$ and $P_2$ across the piston 104 causes the resulting force to move slave piston 104 to the left thereby providing the actual force for rotating shaft 76, gear sector 100 and valve housing 98 clockwise as viewed in FIG. 3.

The above rotation will of course continue for as long as input lever pin 122 causes such rightward displacement of servo valves 142 and 144 relative to the valve housing 98. When the rotation of throttle lever 26 is stopped slave piston 104 will continue its movement in the same direction for some short distance. Such continued movement by slave piston 104 permits servo valves 142 and 144, which are in abutting engagement with pin 122, to experience leftward motion relative to valve housing 98. Such relative motion continues until both of the servo valves 142 and 144 attain their null positions. At the null positions, of course, the pressures across slave or actuating piston 104 are equalized and therefore piston 104 ceases to move.

Of course, the various movements described above with reference to the clockwise rotation of throttle lever 26 are reversed when throttle lever 26 is rotated counterclockwise. However, in both cases the slave or actuator piston 104 provides the force for rotating the shaft 76 as well as the associated components connected thereto as, for example, shaft 162 and related elements within control 164. When throttle lever 26 is rotated counterclockwise, it should be apparent that high pressure $P_1$ is admitted via conduit 108 to cylinder 106 while low pressure $P_2$ is admitted to cylinder 106 via conduit 110. It should, of course, be mentioned that the actual size of the clearance between pin 122 and aperture 124 is preferably kept to a minimum. This is done so that in case a failure is experienced in the hydraulic or fluid pressure system full mechanical control is established as between the input lever 46 and output member 76 with a minimum of lost motion therebetween.

Leaf springs 146 and 148 are designed so that the spring force of spring 146 is greater than that of spring 148. Accordingly, if it is assumed that the throttle lever 26 is at some low throttle position (designated as by indicator 42 being at a position of "30" 30 on the graduated scale 166) and if for some reason the linkage between power lever 10 and throttle lever 26 (as shown in FIG. 1) should become broken, the difference in forces of springs 146 and 148 will cause rightward movement of both servo valves 142 and 144 relative to valve housing 98. As previously described, such relative rightward movement of servo valves 142 and 144 causes high pressure $P_1$ to be admitted, via conduit 110, to cylinder 106 and low pressure $P_2$ to be admitted via conduit 108 to cylinder 106. The resulting pressure differential causes piston 104 to rotate shaft 76, gear sector 100 and valve housing 98 clockwise (as viewed in FIG. 3). As such rotation continues, pin 62, which is carried by input lever assembly 46, is rotated causing abutting engagement with hook end 60 of coil spring 56.

After pin 62 thusly engages hook end 60, rotation of shaft 76, and valve housing 98 continues causing pin 62 to, in this case, at least tend to further deflect coil spring 56 (the question as to whether deflection of coil spring 56 occurs or the degree to which such deflection occurs is, of course, dependent upon the spring constants of springs 146 and 148 as well as the preload imposed on coil spring 56); such rotation continues until the force supplied by coil spring 56, as applied against pin 62, and the force of leaf spring 148 equal the force of spring 146. When this equality of forces is attained, servo valves 142 and 144 return to their null positions, as previously described, causing piston 104 to stop further motion since the pressures thereacross are balanced at the null condition.

If it is assumed that the throttle linkage became broken when the indicator 42 indicated a throttle setting of, for example, "90" on the graduated scale 166, it can be seen, especially in view of FIG. 4 and preceding discussion, that pin 62 of input lever 46 would have at such time substantially deflected coil spring 56 from its normal disengaged position.

If the linkage leading to throttle lever 26 were to now become broken, the force developed by deflected coil spring 56 and applied to pin 60 added to the force of leaf spring 148 exceeds the force of leaf spring 146. Accordingly, as a consequence thereof, both servo valves 142 and 144 experience a leftward movement relative to valve housing 98 thereby, as previously explained, causing low pressure $P_2$ to now be admitted to cylinder 106 via conduit 110 and high pressure $P_1$ to be directed to cylinder 106 via conduit 108. This pressure differential now causes piston 104 to move to the right rotating output shaft 76, valve housing 98 and gear sector 100 counterclockwise. Such counterclockwise rotation will continue until the resistance of coil spring 56 added to the force of leaf spring 148 once again equals the force of leaf spring 146 at which time the servo valves 142 and 144 once again attain null positions and stop all further motion.

Of course, as is evident by the preceding, the angular position at which the null condition of servo valves 142 and 144 is attained, when the linkage leading to the throttle lever 26 is broken, is determined by the position of hook end 60 of spring 56. Accordingly, the angular position of such null condition can be varied by means of the adjustable stop 68. That is, without changing the spring load or spring rate of spring 56, the entire coil spring 56 can be rotated either clockwise or counterclockwise by the adjustable stop 68 so as to thereby select the desired angular position of output shaft 76 whenever the linkage leading to the throttle lever 56 should break.

In view of the preceding, it should be apparent that the invention provides not only an intermediate motion transmitting device for receiving input signals from a remote source and to create output movements in accordance with such input signals, but also such a device which is responsive to the occurrence of a failure in the associated structure for conveying the said input signals and in response thereto create a predetermined output movement. In instances where the invention is employed in combination with an aircraft fuel control, such a predetermined output movement could be one which would establish a desired rate of fuel flow to the engine which would assure continued flight of the aircraft despite the occurrence of such a failure in the structure or linkage conveying the said input signals.

Although only one preferred embodiment of the invention has been disclosed and described, it is apparent that other embodiments and modifications of the invention are possible within the scope of the appended claims.

I claim:

1. A servo device, comprising a housing, a first output member journalled for rotation and carried by said housing, a second input member journalled for rotation and also carried by said housing, at least a first portion of said second input member being operatively constrained by said first output member, valve means carried by said first output member and having a null position with respect thereto, first resilient means urging said valve means into operative engagement with said first portion of said second input member, said first portion of said second input member being effective to at times cause said valve means to experience relative motion with respect to said first output member, a pressure responsive member operatively engaging said first output member, said valve means being effective when moved from said null position as caused by said relative motion to create a pressure differential across said pressure responsive member thereby causing said pressure responsive member to forcibly rotate said first output member as long as the position of said valve means is other than said null position, second resilient means, and a second portion carried by said second input member effective for engaging said second resilient means, said second resilient means being effective to cause said first output member to rotate to a single predetermined angular position with respect to said housing whereat said valve means attain said null position thereby stopping further motion of said pressure responsive member and said first output member, whenever said second portion of said second input member is in engagement with said second resilient means and said second input member is released for free and unrestricted rotational movement with respect to said housing.

2. A servo device according to claim 1 including means for adjustably determining said predetermined angular position.

3. A servo device according to claim 1 wherein said valve means comprises a first valve member, and a second valve member situated within a valve housing portion carried by said first output member, including a plurality of conduit means formed in said valve housing portion, certain of said plurality of conduit means being adapted for communicating relatively high pressure fluid while other of said plurality of conduit means being adapted for communicating relatively low pressure fluid, said first and second valve members being effective for controlling flow through said plurality of conduit means, said first and second valve members being effective when moved from said null position to communicate said high pressure fluid to one side of said pressure responsive member and to communicate said low pressure fluid to the other side of said pressure responsive member.

4. A servo device according to claim 1, including a first chamber formed in said housing, a second chamber formed in said housing, wherein said first output member includes a valve housing portion with an opening formed therein, said valve housing portion being situated within said first chamber for rotation therein with said first output member, wherein said first portion of said second input member is closely received within said opening, wherein said valve housing portion contains said valve means, wherein said pressure responsive member is situated within said second chamber, and wherein said first portion of said second input member is effective to at times cause said relative motion between said valve means and said valve housing.

5. A servo device according to claim 1, including a first chamber formed in said housing, a second chamber formed in said housing, wherein said first output member includes a valve housing portion with an opening formed therein, said valve housing portion being situated within said first chamber for rotation therein with said first output member, wherein said first portion of said second input member is closely received within said opening, wherein said valve housing portion contains said valve means, wherein said pressure responsive member comprises a pressure responsive piston, wherein said piston is slidably received within said second chamber, and wherein said first portion of said second input member is effective to at times cause said relative motion between said valve means and said valve housing.

6. A servo device according to claim 1, including a first chamber formed in said housing, a second chamber formed in said housing, wherein said first output member includes a valve housing portion with an opening formed therein, said valve housing portion being situated within said first chamber for rotation therein with said first output member, wherein said first portion of said second input member is closely received within said opening, wherein said valve housing portion contains said valve means, wherein said pressure responsive member comprises a pressure responsive piston, wherein said piston is slidably received within said second chamber, wherein said first output member and said piston are provided with a gear sector and a gear rack in order to enable said piston to impart motion to said first output member, and wherein said first portion of said second input member is effective to at times cause said relative motion between said valve means and said valve housing.

7. A servo device according to claim 6, wherein said second resilient means comprises a torsion spring anchored so as to have one end adapted for engagement by said second portion of said second input member.

8. A servo device according to claim 6, wherein said second resilient means comprises a coiled torsion spring situated within said second chamber and anchored so as to have one end adapted for engagement by said second portion of said second input member.

9. A servo device according to claim 1, including a first chamber formed in said housing, a second chamber formed in said housing, wherein said first output member includes a valve housing portion with an opening formed therein, said valve housing portion being situated within said first chamber for rotation therein by said first output member, wherein said first portion of said second input member is closely received within said opening, wherein said valve housing portions slidably contain said valve means, wherein said valve means comprise a first valve member and a second valve member, said first and second valve members being slidably carried by first and second valve passages formed within said valve housing portion and being normally urged by said first resilient means in directions toward abutting engagement with said first portion of said second input member, wherein said first resilient means comprises first and second spring means carried by said first output member and respectively operatively engaging said first and second valve members, wherein said pressure responsive member comprises a pressure responsive piston, said piston being slidably received in said second chamber, including first conduit means formed in said valve housing portion and adapted to be placed in communication with an associated source of relatively high fluid pressure, second conduit means formed in said valve housing communicating with said second chamber at one side of said piston and adapted for communication with a source of relatively low fluid pressure, third conduit means formed in said valve housing communicating with said second chamber at a side of said piston opposite to said one side and adapted for communication with said source of relatively low fluid pressure, said first valve passage being so formed as to generally intersect said first and second conduit means, said second valve passage being so formed as to generally intersect said first and third conduit means, said first valve member being effective to complete communication between said second conduit means and said source of low fluid pressure whenever said first portion of said second input member is rotated in the direction of said second valve member in order to thereby communicate said low fluid pressure to said one side of said piston, said second valve member being effective when said first portion of said second input member is rotated in the said direction of said second valve member to prevent communication between said third conduit means and said source of low fluid pressure and to complete communication between said first and third conduit means in order to thereby communicate said high fluid pressure to said other side of said piston, and motion transmitting means operatively interconnecting said first output member and said piston, said motion transmitting means comprising a gear sector carried by said first output member and a cooperating gear rack formed on said piston whereby rotary motion is imparted to said first output member and said valve housing portion by said piston whenever said piston is in motion in said second chamber by virtue of a pressure differential created across said piston by the application thereto of both said relatively high and relatively low fluid pressures.

10. A servo device according to claim 9 wherein said second resilient means comprises a torsion spring anchored to a base member in a manner so as to have one end thereof positioned for engagement by said second portion of said second input member, and including adjustment means effective for engaging said base member so as to position said base member into any of various selectable positions in order to determine the angular position of said first output member at which engagement between said one end of said torsion spring and said second portion of said first input member is achieved.

11. A servo device according to claim 9 wherein one of said first and second spring means normally resiliently exerts a biasing force greater than that exerted by the other of said first and second spring means.